Oct. 29, 1963  A. T. CAPE  3,108,861
NICKEL-BASE BRAZING ALLOYS
Filed Aug. 9, 1961

INVENTOR.
ARTHUR T. CAPE
BY
ATTORNEYS

United States Patent Office 3,108,861
Patented Oct. 29, 1963

3,108,861
NICKEL-BASE BRAZING ALLOYS
Arthur T. Cape, Monterey, Calif., assignor to Coast Metals, Inc., Little Ferry, N.J., a corporation of Delaware
Filed Aug. 9, 1961, Ser. No. 142,468
5 Claims. (Cl. 29—196.6)

This invention relates, as indicated, to improvements in brazing alloys, but has reference more particularly to improvements in nickel-base brazing alloys.

Nickel-base brazing alloys have heretofore been used for brazing or joining honeycomb cores made of stainless steel to the skins or enveloping sheets of structures. Such so-called honeycomb cores are made of very thin stainless steel ranging from .001″ to .002″ in thickness (and occasionally thicker), and incidental to the brazing process, the nickel base brazing alloys diffuse into the ferritic base alloy to a certain extent, forming stable austenite. This formation of stable austenite in this manner, in the thin foils, causes stress due to the difference in coefficients of expansion between the transformed and untransformed material, resulting in a weak structure.

In experiments which were made, using a precipitation hardening alloy known as 17-7 PH, as the base metal, and nickel-base brazing alloys, as the brazing material, it was found that the depth of the austenite formation depended upon the temperature of brazing, the time at brazing temperature, the amount of brazing alloy in relation to the thickness of the base metal, the reducing nature of the atmosphere during brazing, the percentage of boron in the brazing alloy, and the preparation of the surface of the base metal. If the atmosphere is composed of very dry hydrogen, the effect is marked and diffusion may proceed for several thousandths of an inch, and this is also true where extremely good vacua are employed.

I have discovered that the addition of cobalt, in predetermined amounts, to such nickel-base brazing alloys markedly reduces the foregoing diffusion effect into the base metal, and thereby results in stronger structures.

I have made a series of tests, in which the nickel base brazing alloys were of the following compositions:

| No. | Boron, percent | Silicon, percent | Cobalt, percent | Nickel |
|---|---|---|---|---|
| 1 | 3 | 4.7 | None | Remainder. |
| 2 | 3 | 4.7 | None | Do. |
| 3 | 3 | 4.7 | 2.5 | Do. |
| 4 | 2.4 | 4.7 | 7.5 | Do. |
| 5 | 3.10 | 4.7 | 20 | Do. |
| 6 | 3.10 | 4.7 | 20 | Do. |

Figure 1:
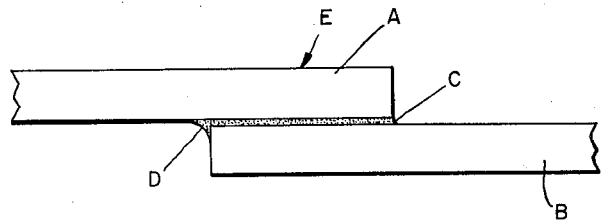

Lap joint samples, as shown in FIG. 1 of the accompanying drawing, were prepared, in which the parts A and B were of #304 Stainless Steel, with a gap or clearance between the parts of .005″. The aforesaid brazing alloys, in the form of a powder were placed at the point C, and the samples were heated in a hydrogen atmosphere to 2050° F. and held at this temperature for one hour, so that the brazing alloy was melted and flowed through the joint between the parts A and B, filling this joint, and providing sufficient brazing alloy to form a fillet D. Millings were then taken from the point E, and analyzed to determine the amount of boron in the millings, and thus the extent or degree of penetration of the brazing alloys in the stainless steel. The stainless steel parts A and B did not contain any boron before the tests were made. The millings were taken to a depth of .020″ from the upper surface of the part A, or to a depth of about one-third the thickness of the part A.

The results of the analyses of the millings for the various brazing alloys were as follows:

Boron in millings, percent
No. 1 _____ .026
No. 2 _____ .028
No. 3 _____ .012
No. 4 _____ .0096
No. 5 _____ .017
No. 6 _____ .017

Figure 2:
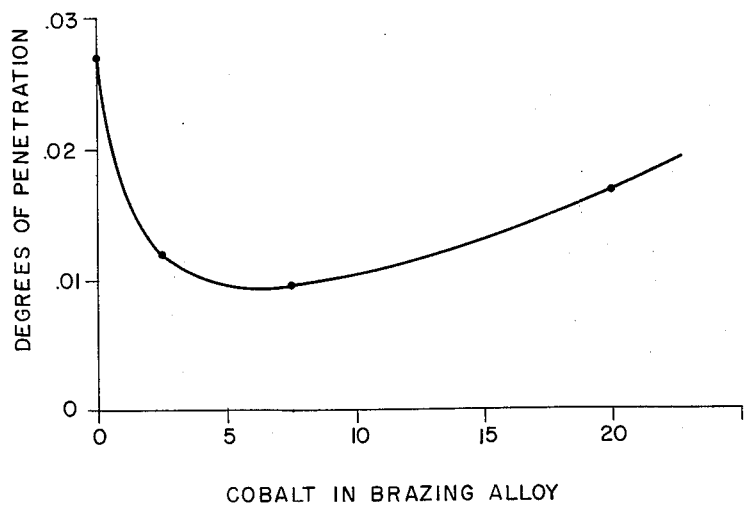

The foregoing results are graphically illustrated in FIG. 2 of the accompanying drawing, in which the abscissa represents the percentage of cobalt in the brazing alloy, and the ordinates represent the extent of penetration of the brazing alloy, in the base metal, as determined by the percentage of boron found in the millings at E.

It is seen from the results of these tests that penetration of the brazing alloy is reduced by more than 50% by the use of as little as 2.5% cobalt in the alloy.

While the curve in FIG. 2 appears to show that there is a considerably smaller penetration of the brazing alloy, with the 7.5% cobalt alloy than with the 2.5% cobalt alloy, the sharp decrease may be explained by the fact that the 7.5% cobalt alloy contained less boron, to start with, than the first three alloys, and this lowered boron content contributed somewhat to the desired effect of reducing the diffusion. However, the net results of these tests and others which I have made lead me to believe that there is actually not much difference in the reduction in the diffusion within a range of from about 2.5 to about 25% of cobalt in the brazing alloy.

Moreover, while there would appear to be no reason, from the viewpoint of decreasing the diffusion effect, in using cobalt in amounts beyond 7.5%, in the brazing alloy, the use of cobalt in amounts up to about 25% is desirable, because the cobalt contributes greatly to the strength of the joint at the interfaces between the brazing alloy and the stainless steel parts which are being joined. The use of cobalt in amounts up to about 25% is therefore desirable, even if there were a slight increase in the penetration with the larger amounts of cobalt.

The brazing alloys which I consider as coming within the scope of my invention are therefore as follows:

Percent
Carbon _____ 0 to .5
Cobalt _____ 2.5 to 25
Boron _____ 1 to 4.5
Silicon _____ 2 to 5.5
Iron _____ 0 to 5
Nickel _____ Remainder In all cases, the silicon must be present in the alloy in an amount in excess of the boron content of the alloy.

Examples of alloys coming within the aforesaid ranges are as follows:

|  | No. 1 | No. 2 |
|---|---|---|
| Cobalt | 7.5 | 20 |
| Boron | 2.4 | 2.85 |
| Silicon | 4.7 | 4.35 |
| Nickel | Remainder | Remainder |

Various other elements, such as chromium, manganese, etc., may be present in the alloy, in residual or trace amounts, or as impurities, without materially affecting the usefulness of the alloy, as a brazing material. However, the combined total of such elements should not exceed 3%, and the term "remainder substantially all nickel," as used in the claims is intended to include the presence of such elements, in a combined total not to exceed about 3%.

The melting point range of brazing alloys of these compositions is approximately 1800–1900° F.

It will be understood that various changes in the aforesaid alloys may be made, within the scope of the appended claims.

This application is a continuation-in-part of my application, Serial No. 631,077, filed December 28, 1956, now abandoned, and my copending application, Serial No. 742,779, filed June 18, 1958, now abandoned.

Having thus described my invention, I claim:

1. A nickel-base brazing alloy, especially adapted for brazing honeycomb cores of stainless steel to the skins of structures, said alloy consisting of 0 to .5% carbon, from about 2.5% to about 20% cobalt, from about 1% to about 4.5% boron, from about 2% to about 5.5% silicon, the silicon being always in excess of the boron, and the remainder substantially all nickel, the diffusibility of said alloy in said stainless steel being virtually negligible.

2. A nickel-base brazing alloy, especially adapted for brazing honeycomb cores of stainless steel to the skins of structures, said alloy consisting of about 2.4% boron, about 4.7% silicon, about 7.5% cobalt, and the remainder substantially all nickel, the diffusibility of said alloy in said stainless steel being virtually negligible.

3. A nickel-base brazing alloy, especially adapted for brazing honeycomb cores of stainless steel to the skins of structures, said alloy consisting of about 2.85% boron, about 4.35% silicon, about 20% cobalt, and the remainder substantially all nickel, the diffusibility of said alloy in said stainless steel being virtually negligble.

4. The method of brazing honeycomb cores of stainless steel to skins or enveloping structures, said method consisting of brazing the parts together by means of a nickel-base brazing alloy consisting of 0 to .5% carbon, from about 2.5% to about 20% cobalt, from about 1% to about 4.5% boron, from about 2% to about 5.5% silicon, the silicon being always in excess of the boron, and the remainder substantially all nickel, at a temperature in excess of about 1800° F., the cobalt being sufficient in amount to markedly reduce the diffusion of the brazing alloy into the stainless steel.

5. A brazed structure consisting of parts of stainless steel, and a brazing alloy interposed between said parts and fused thereto securing them together, said brazing alloy consisting of 0 to .5% carbon, from about 2.5% to about 20% cobalt, from about 1% to about 4.5% boron, and from about 2% to about 5.5% silicon, the silicon being always in excess of the boron, and the remainder of the alloy being substantially all nickel, the diffusion of the brazing alloy in said stainless steel parts being virtually negligible.

References Cited in the file of this patent

UNITED STATES PATENTS

| | | |
|---|---|---|
| 2,162,253 | Grossman | July 13, 1939 |
| 2,757,084 | Cape et al. | July 31, 1956 |
| 2,962,811 | Herbert | Dec. 6, 1960 |